(12) United States Patent
Huang et al.

(10) Patent No.: US 10,871,289 B2
(45) Date of Patent: Dec. 22, 2020

(54) SMOKE REMOVAL DEVICE

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW); Kuan-Chou Lin, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 77 days.

(21) Appl. No.: 16/201,575

(22) Filed: Nov. 27, 2018

(65) Prior Publication Data

US 2020/0166209 A1 May 28, 2020

(51) Int. Cl.
*F23B 10/00* (2011.01)
*F23G 7/06* (2006.01)
(Continued)

(52) U.S. Cl.
CPC ......... *F23G 7/065* (2013.01); *B01D 46/2403* (2013.01); *F23J 15/022* (2013.01)

(58) Field of Classification Search
CPC . F23D 5/04; F23D 14/62; F23D 14/64; F23D 14/02; F23D 14/08; F23D 14/70; F23D 14/06; F23D 14/583; F23D 2900/14021; F23D 14/24; F23D 1/00; F23D 2207/00; F23D 14/04; F23D 2203/10; F23D 2203/1017; F23D 2209/20;
(Continued)

(56) References Cited

U.S. PATENT DOCUMENTS

| 4,336,017 A | 6/1982 | Desty |
| 4,483,832 A | 11/1984 | Schirmer |

(Continued)

FOREIGN PATENT DOCUMENTS

| CN | 105026712 A | 11/2015 |
| CN | 107036138 A | 8/2017 |

(Continued)

OTHER PUBLICATIONS

Examination Report for TW107133271, dated Apr. 16, 2019, Total of 10 pages.

(Continued)

*Primary Examiner* — Jason Lau
(74) *Attorney, Agent, or Firm* — Tracy M Heims; Apex Juris, pllc.

(57) ABSTRACT

A smoke removal device, which can burn the particulates in the smoke efficiently, includes a tube body and a combustion unit. The combustion unit is provided in the tube body and includes a main body, a gas pipeline, and a lighter. The main body is located at a first end of the tube body. A smoke passage is formed between a periphery of the main body and an inner wall of the tube body, and the smoke enters the smoke removal device through the smoke passage. The main body has a central passage therethrough, where a fuel gas is ignited. The fuel gas is guided to the central passage through the gas pipeline and then ignited by the lighter to burn the smoke particulates passing through the smoke passage.

14 Claims, 8 Drawing Sheets

(51) Int. Cl.
  *F23J 15/02* (2006.01)
  *B01D 46/24* (2006.01)
(58) Field of Classification Search
  CPC . F23D 2900/00003; F23D 2900/14701; F23D 11/402; F23D 11/408; F23D 14/045; F23D 14/36; F23D 14/58; F23D 14/68; F23D 2201/20; F23D 2203/007; F23D 2900/11401; F23D 91/02; F23D 11/101; F23D 11/107; F23D 11/14; F23D 11/24; F23D 11/38; F23D 11/383; F23D 11/406; F23D 11/443; F23D 14/10; F23D 14/16; F23D 14/22; F23D 14/46; F23D 14/60; F23D 14/66; F23D 14/72; F23D 14/725; F23D 14/84; F23D 17/002; F23D 1/02; F23D 2201/10; F23D 2203/1012; F23D 2203/102; F23D 2203/1026; F23D 2209/10; F23D 2214/00; F23D 2900/00008; F23D 2900/11402; F23D 2900/14002; F23D 2900/14004; F23D 2900/14062; F23D 2900/14063; F23D 2900/14241; F23D 2900/14481; F23D 2900/21002; F23D 2900/21006; F23D 3/40; F23D 5/123; F23D 5/126; F23C 7/004; F23C 2201/20; F23C 7/002; F23C 2900/01001; F23C 2900/06041; F23C 6/045; F23C 2900/99005; F23C 99/00; F23C 99/001; F23C 10/007; F23C 13/06; F23C 15/00; F23C 2201/101; F23C 2201/30; F23C 2202/10; F23C 2203/20; F23C 2900/03005; F23C 2900/06043; F23C 2900/07002; F23C 2900/09002; F23C 2900/99001; F23C 2900/9901; F23C 3/002; F23C 6/042; F23C 6/047; F23C 7/00; F23C 7/008; F23C 7/02; F23C 9/00; F23C 9/006
  See application file for complete search history.

(56) References Cited

U.S. PATENT DOCUMENTS

| | | | | |
|---|---|---|---|---|
| 4,958,619 | A * | 9/1990 | Kardas | F23C 6/045 126/110 B |
| 5,359,966 | A * | 11/1994 | Jensen | F23C 3/006 122/17.1 |
| 6,363,868 | B1 * | 4/2002 | Boswell | F23C 3/006 110/213 |
| 2006/0147854 | A1 * | 7/2006 | Fullemann | F23C 9/006 431/9 |
| 2009/0016048 | A1 * | 1/2009 | McBrien | F21L 17/00 362/180 |
| 2016/0290654 | A1 * | 10/2016 | Chen | F23D 14/84 |

FOREIGN PATENT DOCUMENTS

| | | |
|---|---|---|
| CN | 207279619 U | 4/2018 |
| EP | 2543930 A1 | 1/2013 |
| TW | M530385 U | 10/2016 |

OTHER PUBLICATIONS

Search Report for TW107133271, dated Apr. 16, 2019, Total of 1 page.
English Abstract for CN105026712, Total of 1 page.
English Abstract for CN207279619, Total of 1 page.
English Abstract for TWM530385, Total of 1 page.
English abstract for CN107036138, Total of 1 page.
Extended European search report for EP19195899.0, dated Jan. 20, 2020, Total of 7 pages.

* cited by examiner

SMOKE REMOVAL DEVICE

BACKGROUND OF THE INVENTION

Technical Field

The present invention is related to a burner and, more particularly, to a smoke removal device, which is used to efficiently burn the particulates in the smoke.

Description of Related Art

Conventional combustion devices (e.g., furnaces, gold furnaces, or coffee bean roasters) generate particulates during combustion of the material, and the thermal energy provided by the combustion device changes the density of the air, thereby generating a gas flow and forming the smoke full of the particulates. Finally, the particulates are discharged outside the combustion device with the smoke and dispersed in the air.

The smoke full of the particulates and dispersed in the air would pollute the environment. The particulates with small volume and light mass are moved by the gas flow easily, result in increasing the possibility of the particulates being inhaled. When being inhaled by the creature and getting into the respiratory tract of the creature, the particulates would stimulate the respiratory tract and could cause the creature to be uncomfortable, like being allergic or suffering from asthma. Some particulates would even attach to the lung and could not be discharged which causes the creature to suffer from a more serious disease, such as bronchitis or pneumonia. Furthermore, some smoke not only contains the particulates but also contains toxic metal carcinogen that would make the body feel ill and even worse have a risk of getting cancer.

A known solution to deal with the problems above is installing a filter element or a filter net on the smoke discharge route of the burner to filter the particulates in the smoke. However, the filter element or the filter net needs to be regularly replaced to ensure its filtering quality for the particulates. However, it costs high to use the filter element or the filter net to filter the particulates and it is not an easy work to replace the filter element or the filter net regularly. Especially, the bigger the burner is, the more obvious the disadvantage of using these kinds of filter would be, so the use of the filter element or the filter net is not a practical way to deal with the problems mentioned above.

BRIEF SUMMARY OF THE INVENTION

In view of the above, the purpose of the present invention is to provide a smoke removal device which can effectively burn off the particulates in the smoke.

The present invention provides a smoke removal device including a tube body and a combustion unit. The tube body includes a first end and a second end opposite to the first end. The combustion unit includes a main body, a gas pipeline, and a lighter. The main body is located at the first end of the tube body. A smoke passage is formed between a periphery of the main body and an inner wall of the tube body. The smoke gets into the smoke removal device through the smoke passage. The main body has a central passage communicating with the smoke passage. A fuel gas is guided into the central passage by the gas pipeline and then is ignited by the lighter located in the central passage to generate a fire. The fire then burns the particulates in the smoke passing through the smoke passage.

The advantage of the present invention is that efficiently facilitates the particulates passing through the smoke passage to be burned by the fire produced by the burner, and decreases the possibility that the fuel gas released from the gas pipeline is interfered by the air flow formed by the particulates passing through.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
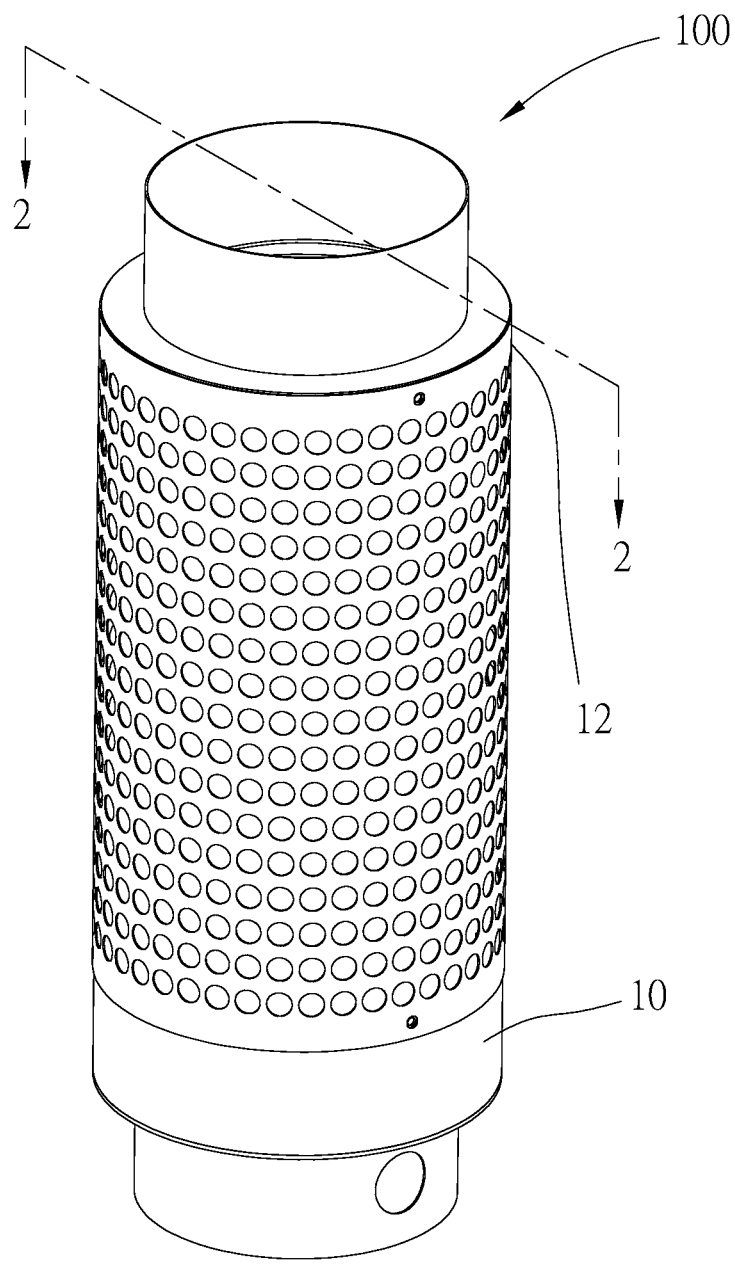
FIG. 1 is a perspective view showing the smoke removal device according to a first embodiment of the present invention.
Figure 2:
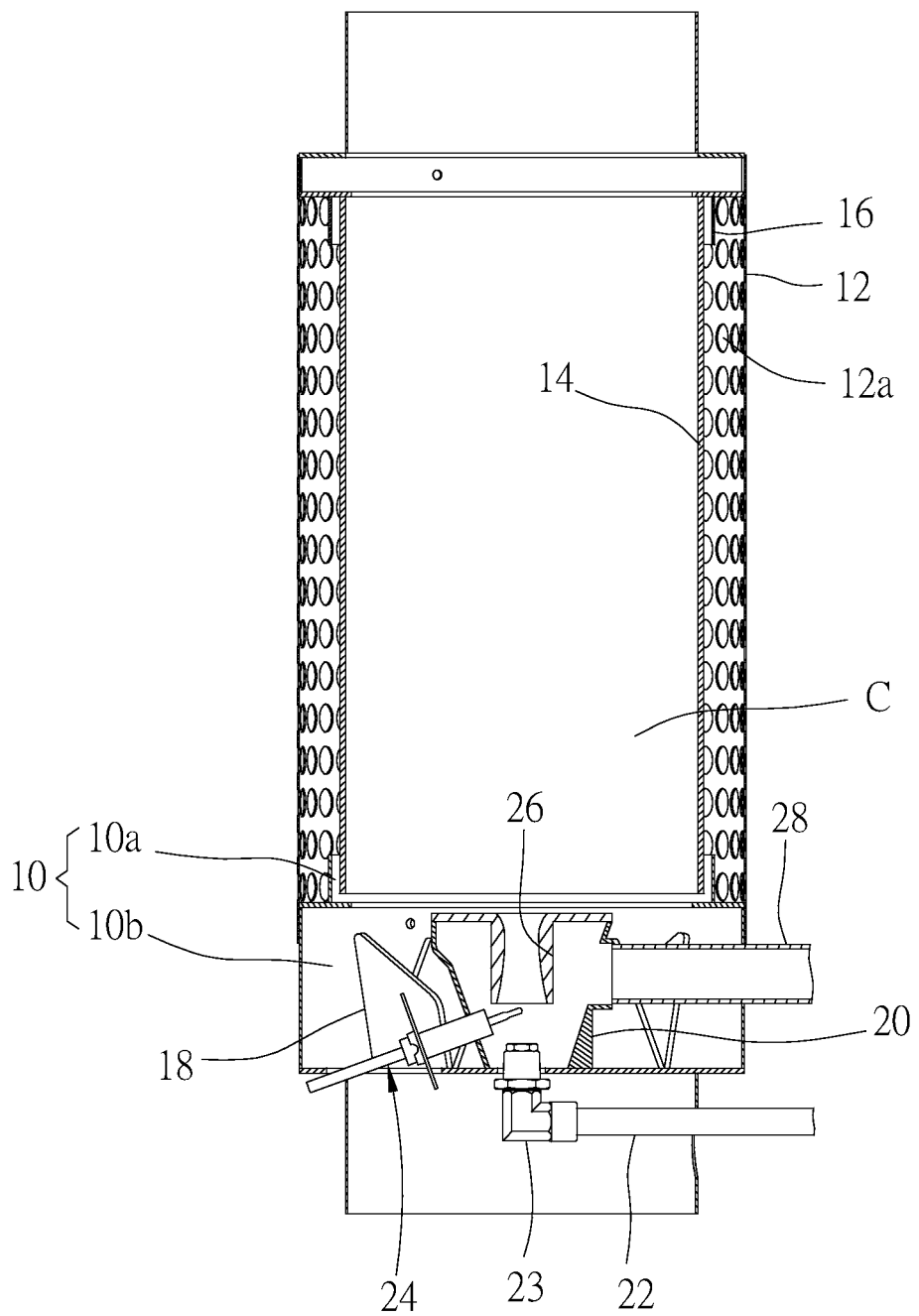
FIG. 2 is a cross-sectional view taken along line 2-2 in FIG. 1 disclosing the inside structure of the smoke removal device of the first embodiment.

The embodiments of the smoke removal device of the present invention will be explained clearly with reference to the drawings thereafter. FIG. 1 to FIG. 4 show the smoke removal device 100 of the first embodiment.

The smoke removal device 100 includes a base 10, a cylinder 12, a tube body 14, a converging tube 16, a guiding fan 18, and a combustion unit. The base 10 being a hollow structure has a fixing portion 10a and an accommodating room 10b. The fixing portion 10a is located in the cylinder 12. The cylinder 12 is mounted on the base 10 and has a plurality of heat dissipation openings 12a. A first end of the tube body 14 is connected to the fixing portion 10a of the base 10, while a second end of the tube body 14 is connected to the converging tube 16, thereby the base 10, the tube body 14 and the converging tube 16 all communicating to each other. The guiding fan 18 is provided in the accommodating room 10b of the base 10 and surrounds the combustion unit.

The combustion unit includes a main body 20, a gas pipeline 22, a lighter 24, and a Venturi tube 26. The main body 20 is located at the first end of the tube body 14 and is disposed in the accommodating room 10b. A smoke passage C is formed between a periphery of the main body 20 and an inner wall of the tube body 14 as well as between the periphery of the main body 20 and an inner wall of the base 10.

Figure 3:
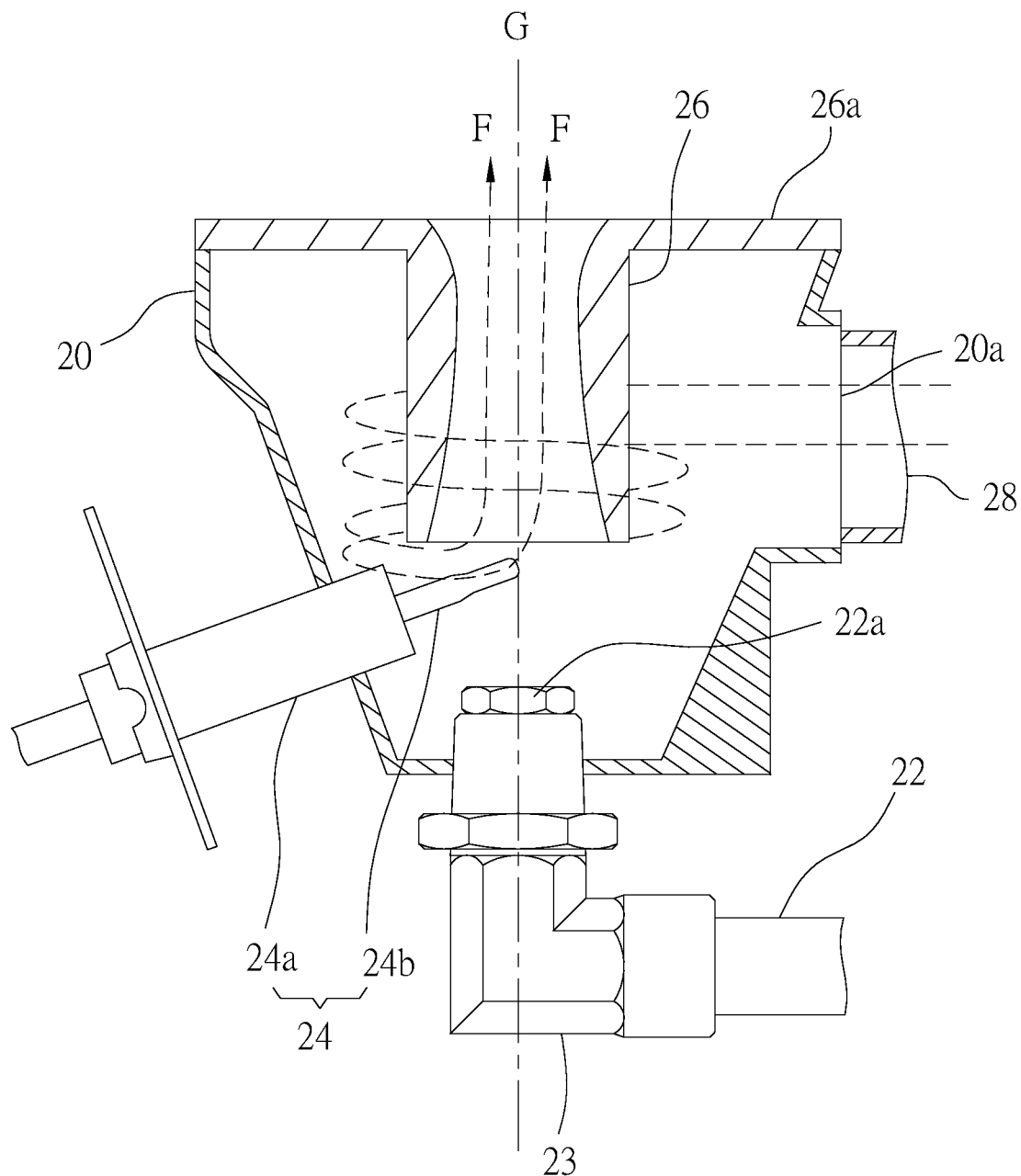
FIG. 3 is an enlarged view of the combustion unit shown in FIG. 2.

Referring to FIG. 3, the main body 20 has a central passage G going through the main body 20 from a bottom surface to a top surface and being conical in shape. An end of the gas pipeline 22 is connected to a fuel gas supplier (not shown), while the other end of the gas pipeline 22 is provided with a connecting tube 23. The connecting tube 23 passes through the bottom surface of the main body 20, extends into the central passage G, forms a gas outlet in the central passage G, and is connected to a nozzle 22a through the gas outlet. Therefore, the fuel gas could be guided by the gas pipeline 22, the connecting tube 23, and then the nozzle 22a to flow into the central passage G.

The lighter 24 is provided in the central passage G and has a heating end above the gas outlet of the gas pipeline 22 for igniting the fuel gas in the central passage G. In the present embodiment, the lighter 24 has a seat 24a and an electric fire bar 24b as the heating end mentioned above. The electricity is delivered from the seat 24a to the electric fire bar 24b which converts the electricity into the heat energy. The electric fire bar 24b in high temperature is adapted to ignite the fuel gas in the central passage G to generate the fire, and then the fire burns the smoke passing through the smoke passage C. In practice, the lighter 24 could ignite the fuel gas in other manners (for example, using the spark generated by a high-voltage power supply).

The Venturi tube 26 is located in the central passage G of the main body 20. An end of the Venturi tube 26 is connected to a top portion of the main body 20 through a cover 26a and faces the tube body, while the other end of the Venturi tube 26 extends toward but is above the gas outlet of the gas pipeline at the bottom of the main body 20. The Venturi tube 26 has a tapering portion where the Venturi tube 26 has the smallest diameter. When the fuel gas gets into the Venturi tube 26 and passes through the tapering portion, the flowing rate of the fuel gas would increase. In an embodiment, the Venturi tube 26, the cover 26a, and the main body 20 could be integrally formed as a monolithic unit. The central passage G communicates with the tube body 14 through the Venturi tube 26.

The main body 20 has a lateral opening 20a on its side wall, though the number of the lateral opening 20a is not limited as above and could be two or more. The lateral opening 20a is located above the gas outlet, faces a wall of the Venturi tube 26, and is adapted for the outer air getting into the central passage G. If the air in the main body 20 is not enough for combustion, a blower (not shown) located outside the smoke removal device 100 could be connected to the lateral opening 20a through a connecting pipe 28, to efficiently supply the air. After entering the main body 20, the air would flow around an outer wall of the Venturi tube 26. When flowing to the end of the Venturi tube 26 close to the bottom of the main body 20, the air would enter the Venturi tube 26 with the fuel gas. Referring to FIG. 3, the arrow F shows the direction of the air flow.

Figure 4:
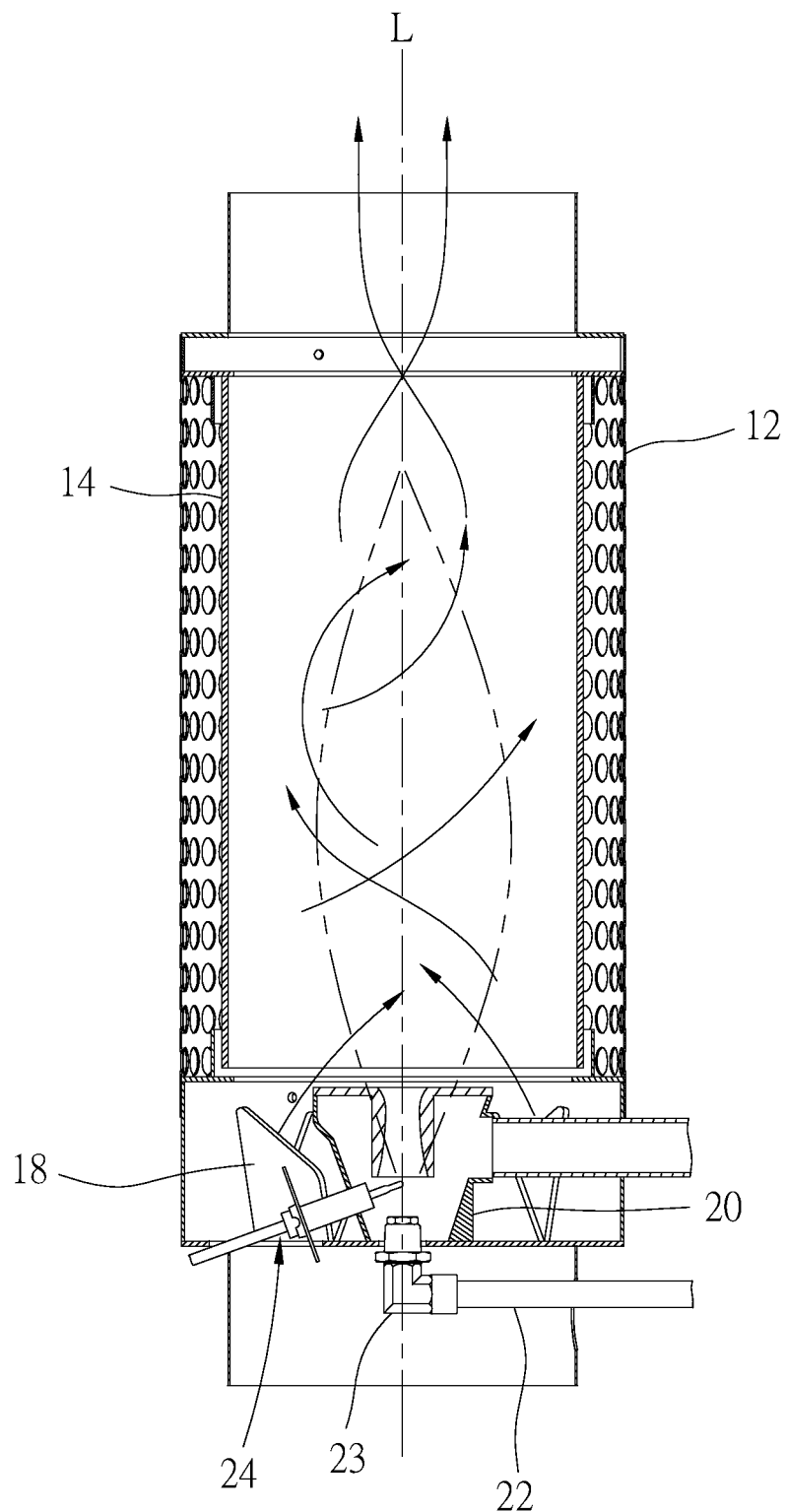
FIG. 4 is a cross-sectional view taken along line 2-2 in FIG. 1 disclosing the flow direction of the smoke in the smoke removal device.

The guiding fan 18 forces the smoke to flow upward around a reference axis L when the smoke gets into the tube body 14 (as shown in FIG. 4), which increases the chance of the smoke to be burned by the fire produced by the combustion unit, thereby decreasing the amount of the residual particulates in the smoke to reduce the pollution caused to the environment.

All in all, with the aforementioned design of the combustion unit, the particulates in the smoke could be totally burned by the fire produced by the combustion unit, when passing through the smoke passage C. It is also worth mentioning that by the arrangement of the main body 20, the gas pipeline 22 and the lighter 24 in the combustion unit, the fuel gas would not be interfered by the smoke passing through the smoke passage C when leaving the gas outlet. A chance that the concentration of the fuel gas would be decreased due to being interfered by the smoke could be ruled out. The lighter 24 would fail to ignite the fuel gas if the concentration of the fuel gas is too low. A space between the cylinder 12 and the tube body 14 is adapted to prevent the cylinder 12 from raising temperature quickly due to the heat released from the tube body 14, so that a user would not suffer scald when touching the cylinder 12.

Figure 5:
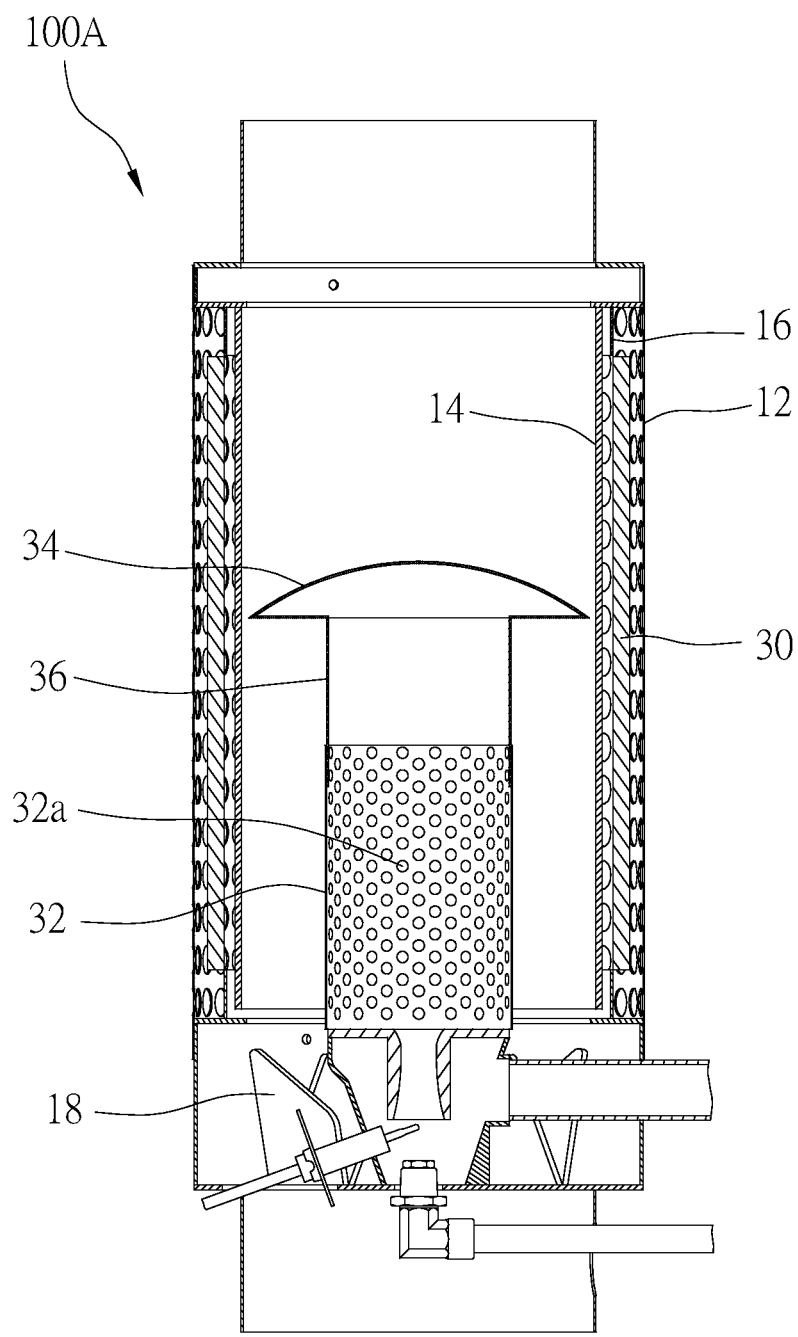
FIG. 5 is a cross-sectional view showing the smoke removal device according to a second embodiment of the present invention.
Figure 6:
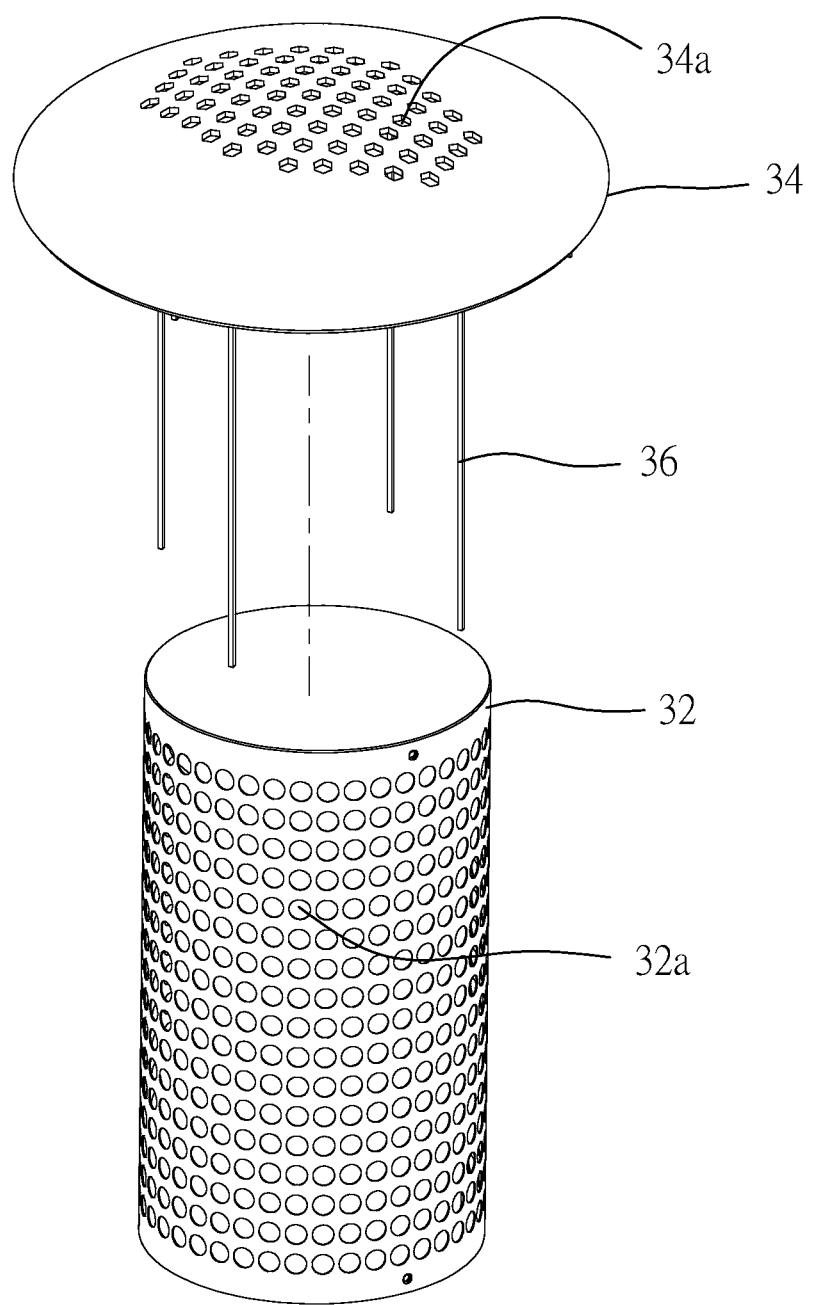
FIG. 6 is a perspective view of some components of the smoke removal device shown in FIG. 5.

FIG. 5 and FIG. 6 show the smoke removal device 100A according to a second embodiment. The structure and the function of the base 10, the cylinder 12, the tube body 14, the converging tube 16, the guiding fan 18, and the combustion unit of the smoke removal device 100A in the second embodiment are the same as that in the first embodiment, so they would not be described again thereafter. It is worth to be mentioned that the smoke removal device 100A of the second embodiment further includes a heat insulation layer 30, an extending tube 32, a shielding plate 34, and a support frame 36.

The heat insulation layer 30 is located between the tube body 14 and the cylinder 12 to prevent the transfer of heat from where the heat insulation layer 30 faces the tube body 14, which makes the temperature of the cylinder 12 not increase easily. In practice, the heat insulation layer 30 could be a layer or a film made of ceramic material or polymeric material. The diameter of the extending tube 32 is less than that of the tube body 14, and the extending tube 32 is disposed on the main body 20 of the combustion unit. An end of the support frame 36 is connected to the extending tube 32, while the other end of the support frame 36 is connected to the shielding plate 34.

In the present embodiment, the support frame 36 is adjustable in length, though, in practice, it could be designed in a constant length. Furthermore, the extending tube 32 and the shielding plate 34 both have a plurality of flame openings 32a and 34a respectively on their walls (shown in FIG. 6). The diameter of the shielding plate 34 is less than the inner diameter of the tube body 14, but is more than or is equal to three quarters of the inner diameter of the tube body 14. The shielding plate 34 is adapted to keep most of the fire below it, and most of the smoke could be burned here.

With the design of the extending tube 32, the shielding plate 34 and the support frame 36 of the present embodiment, the fire produced by the combustion unit could concentrate to a central axis of the tube body 14 instead of deviating due to being interfered by the flowing smoke. After going up, the fire would be blocked by the shielding plate 34, and then form a fire wall along the shielding plate 34 within the tube body 14. A gas flow rises when it receives the heat from the fire, which causes pressure difference in the extending tube 32 and forces the outer smoke to flow into the extending tube 32 and be burned by the fire. The smoke which is still between the extending tube 32 and the tube body 14 could also be burned by the fire which goes out through the flame openings 32a of the extending tube 32 or goes out through the support frame 36. The smoke that goes up with the rising gas flow could be burned by the fire wall, the heating shielding plate 34, or the fire going out through the flame openings 34a in the shielding plate 34.

In practice, a user could choose whichever the extending tube 32, the shielding plate 34, and the support frame 36 to assemble and dispose, such the selectivity depending on his need. Besides the aspect of the second embodiment, the user could dispose only the extending tube 32 on the main body 20 without the other two, or dispose the extending tube 32 on the main body 20 through the support frame 36 without the extending tube 32.

Figure 7:
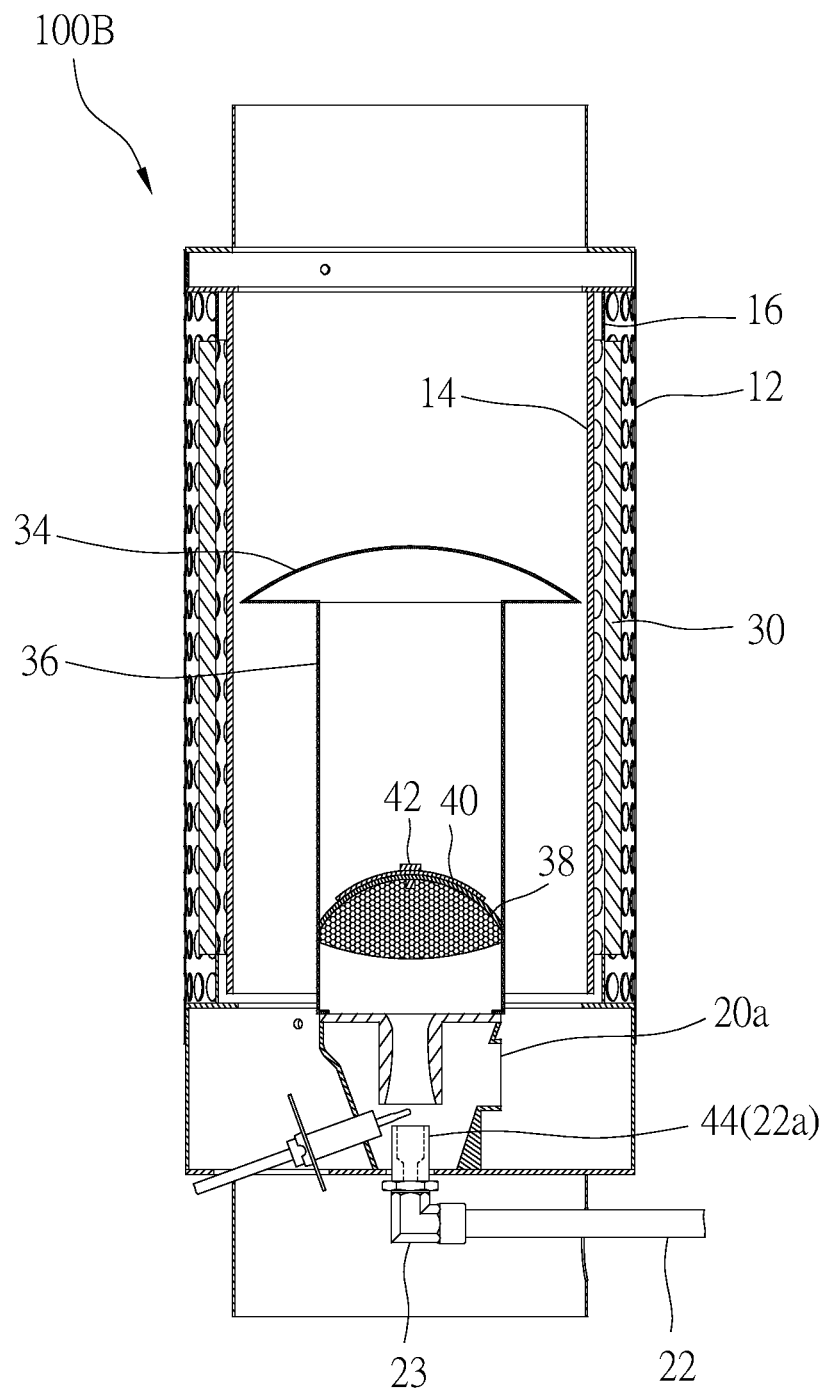
FIG. 7 is a cross-sectional view showing the smoke removal device according to a third embodiment of the present invention.
Figure 8:
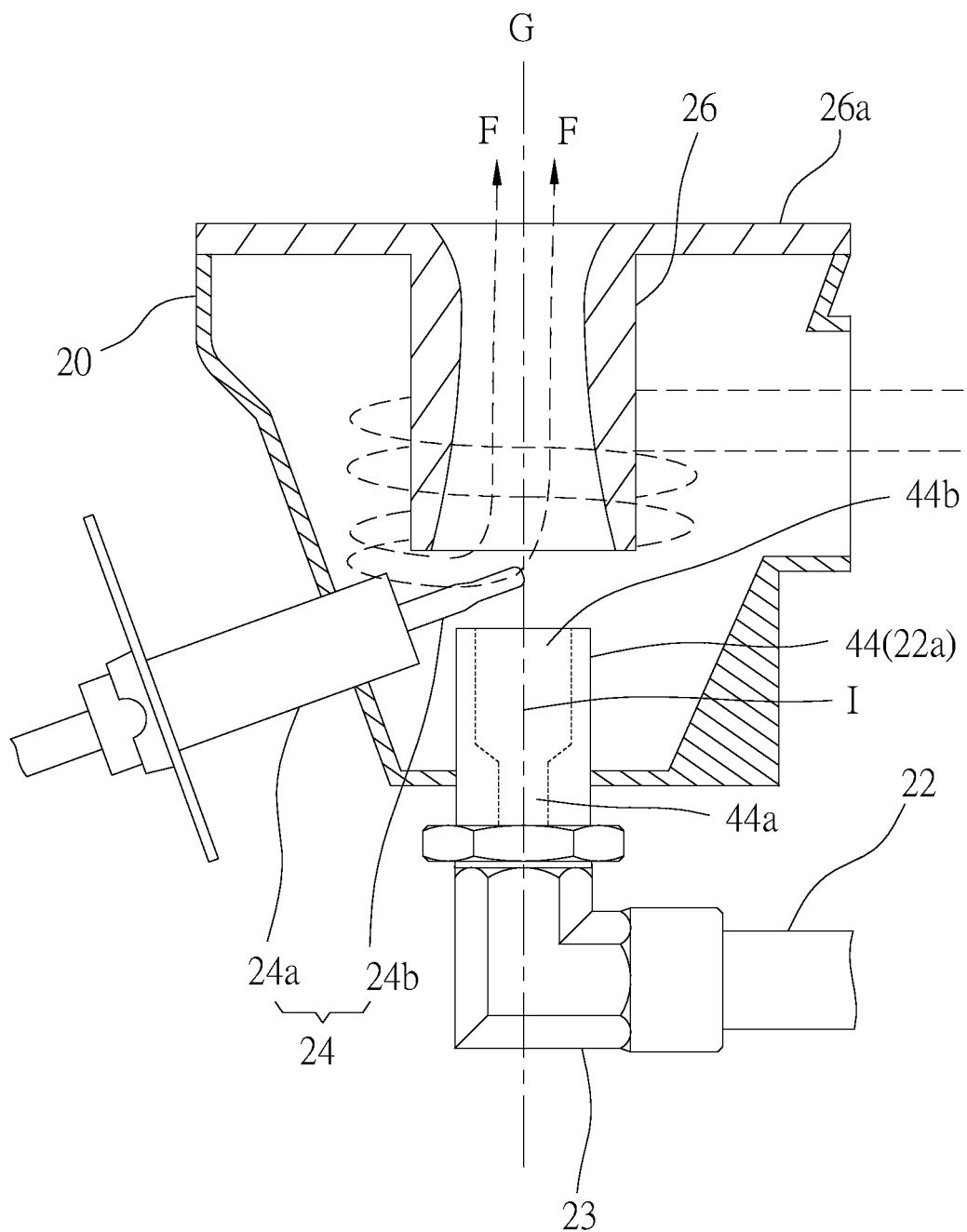
FIG. 8 is an enlarged view of the combustion unit shown in FIG. 7.

FIG. 7 and FIG. 8 show the smoke removal device 100B according to a third embodiment. Most of the components and the structure of the smoke removal device 100B in the present embodiment are similar to that of the second embodiment so they would not be mentioned again hereafter. It is to be noted that the present embodiment discloses the smoke removal device 100B without the guiding fan 18, the connecting pipe 28, and the extending tube 32, so the air for combustion comes from the smoke passage C. The air gets into the main body 20 through the lateral opening 20a and flows as the arrow F shows, which has described above.

In the present embodiment, the shielding plate 34 is supported above the main body 20 through the support frame 36, and the support frame 36 is directly disposed on the main body 20. The smoke removal device 100B further includes a heat storage mesh 38 and a flame shield 40. The heat storage mesh 38 is a metal mesh, for example a ferrite-chromium-aluminum mesh supported by the support frame 36 through an outer periphery of the heat storage mesh 38 between the main body 20 and the shielding plate 34 and corresponds to the central passage G. The flame shield 40 is disposed at a side of the heat storage mesh 38 near the shielding plate 34 and is fixed through a bolt and a nut 42.

The shielding plate 34 could slow down the flow rate of the smoke entering the smoke removal device 100B, which elongates the time of the smoke staying within the smoke removal device 100B. The heat storage mesh 38 is heated by the fire, and the particulates in the smoke are burned by the heat storage mesh 38 then. The fire is guided by the flame shield 40 to spread toward the peripheral of the heat storage mesh 38, which makes more surface area of the heat storage mesh 38 be in contact with the fire. Such design permits the particulates in the smoke to be totally burned. In an embodiment, the smoke removal device 100B may not use the flame shield 40.

Moreover, in the present embodiment, the nozzle 22a is a windproof nozzle 44 having an entrance 44a, and an exit 44b. The entrance 44a is connected to the connecting tube 23, and the exit 44b faces the Venturi tube 26. There is provided a gas outlet I between the entrance 44a and the exit 44b in the windproof nozzle 44, and the inner diameter of the exit 44b is greater than that of the entrance 44a, so that the fuel gas would not be dispersed by the air flow.

It must be pointed out that the embodiments described above are only some embodiments of the present invention. All equivalent structures which employ the concepts disclosed in this specification and the appended claims should fall within the scope of the present invention.

What is claimed is:

1. A smoke removal device provided on a smoke exhaust pathway, comprising:
   a tube body including a first end and a second end opposite to the first end;
   a combustion unit including a main body, a gas pipeline and a lighter, wherein a smoke passage is formed between a periphery of the main body and an inner wall of the tube body; the main body is located at the first end of the tube body and includes a central passage communicating with the smoke passage; the gas pipeline guides a fuel gas into the central passage; the lighter is located in the central passage to ignite the fuel gas within the central passage to burn a smoke passing through the smoke passage;
   a support frame and a shielding plate supported above the main body by the support frame; the shielding plate has a top surface and a bottom surface, wherein the top surface of the shielding plate faces the second end of the tube body, and the bottom surface of the shielding plate faces the first end of the tube body; and wherein a nozzle of the gas pipeline is located within a portion of the combustion unit formed by a projection of the shielding plate along an axial direction of the tube body;
   a heat storage mesh supported above the main body by the support frame and located under the shielding plate; and
   a flame shield disposed on the heat storage mesh and corresponding to the central passage.

2. The smoke removal device as claimed in claim 1, wherein the lighter includes an electric fire bar, a heating end of which is located in the central passage.

3. The smoke removal device as claimed in claim 1, wherein the gas pipeline includes a gas outlet located in the central passage; the combustion unit includes a Venturi tube located in the central passage; an end of the Venturi tube is connected to the main body and faces the tube body, while the other end of the Venturi tube extends toward the gas outlet of the gas pipeline; and the central passage communicates with the tube body through the Venturi tube.

4. The smoke removal device as claimed in claim 3, wherein the main body includes at least one lateral opening located above the gas outlet to allow an air flowing into the central passage.

5. The smoke removal device as claimed in claim 4, wherein the central passage of the main body is conical in shape.

6. The smoke removal device as claimed in claim 5, wherein the gas pipeline includes the nozzle and a connecting tube; the nozzle is located in the central passage and has an entrance, an exit, and a gas outlet, the entrance is connected to the connecting tube, the exit faces the Venturi tube, the gas outlet is located between the entrance and the exit, and a diameter of the exit is greater than that of the entrance.

7. The smoke removal device as claimed in claim 6, wherein the lateral opening faces a wall of the Venturi tube.

8. The smoke removal device as claimed in claim 1, further including a cylinder fitted around the tube body.

9. The smoke removal device as claimed in claim 8, further including a heat insulation layer located between the cylinder and the tube body.

10. The smoke removal device as claimed in claim 1, wherein the support frame is adjustable in length.

11. The smoke removal device as claimed in claim 10, wherein the shielding plate has a plurality of flame openings.

12. The smoke removal device as claimed in claim 1, further including an extending tube, wherein an end of the extending tube is connected to the main body, the other end of the extending tube is connected to an end of the support frame, and the other end of the support frame is connected to the shielding plate.

13. The smoke removal device as claimed in claim 12, wherein the extending tube has a plurality of flame openings in its tube wall.

14. The smoke removal device as claimed in claim 1, further including an extending tube, wherein a diameter of the extending tube is less than that of the tube body; an end of the extending tube is connected to the main body, and the extending tube has a plurality of flame openings in its tube wall.

* * * * *